US012222074B2

(12) United States Patent
Onushkin et al.

(10) Patent No.: US 12,222,074 B2
(45) Date of Patent: Feb. 11, 2025

(54) LIGHT EMITTING DIODE FILAMENT

(71) Applicant: SIGNIFY HOLDING B.V., Eindhoven (NL)

(72) Inventors: Grigory Alexandrovich Onushkin, Eindhoven (NL); Aldegonda Lucia Weijers, Eindhoven (NL); Jan De Graaf, Uden (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 18/559,085

(22) PCT Filed: Apr. 28, 2022

(86) PCT No.: PCT/EP2022/061399
§ 371 (c)(1),
(2) Date: Nov. 6, 2023

(87) PCT Pub. No.: WO2022/233715
PCT Pub. Date: Nov. 10, 2022

(65) Prior Publication Data

US 2024/0230037 A1 Jul. 11, 2024

(30) Foreign Application Priority Data

May 7, 2021 (EP) .................................... 21172834

(51) Int. Cl.

| | |
|---|---|
| ***F21K 9/232*** | (2016.01) |
| ***F21K 9/237*** | (2016.01) |
| ***F21K 9/90*** | (2016.01) |
| *F21Y 103/10* | (2016.01) |
| *F21Y 115/10* | (2016.01) |

(52) U.S. Cl.
CPC .............. *F21K 9/232* (2016.08); *F21K 9/237* (2016.08); *F21K 9/90* (2013.01); *F21Y 2103/10* (2016.08); *F21Y 2115/10* (2016.08)

(58) Field of Classification Search
CPC ....... F21K 9/232; F21K 9/237; F21Y 2103/10
See application file for complete search history.

(56) References Cited

U.S. PATENT DOCUMENTS

| | | | | |
|---|---|---|---|---|
| 10,128,426 | B1 | 11/2018 | Zykin et al. | |
| 2018/0087724 | A1* | 3/2018 | Bergenek | F21V 19/0025 |
| 2018/0100624 | A1* | 4/2018 | Bergenek | F21K 9/232 |
| 2019/0017657 | A1 | 1/2019 | Kim et al. | |
| 2022/0390074 | A1 | 12/2022 | Van Der Lubbe et al. | |

FOREIGN PATENT DOCUMENTS

| | | | |
|---|---|---|---|
| CN | 204187337 | U | 3/2015 |
| CN | 205655147 | U | 10/2016 |
| CN | 112097129 | A | 12/2020 |

(Continued)

*Primary Examiner* — Karabi Guharay

(57) ABSTRACT

The present invention relates to an LED filament (10), comprising: a first LED filament portion (12*a*) comprising a plurality of first LEDs (14*a*) adapted to emit first LED filament light: a second LED filament portion (12*b*) parallel to the first LED filament portion (12*a*) and comprising a plurality of second LEDs (14*b*) adapted to emit second LED filament light: and at least one light-blocking wall (26) arranged between the first and second LED filament portions to reduce or prevent optical cross-talk between the first and second LEDs.

13 Claims, 6 Drawing Sheets

(56) References Cited

FOREIGN PATENT DOCUMENTS

| | | | |
|---|---|---|---|
| DE | 102011000657 | A1 | 8/2012 |
| JP | 2010040720 | A | 2/2010 |
| JP | 2016021555 | A | 2/2016 |
| JP | 2020534678 | A | 11/2020 |
| WO | 2020152088 | A1 | 7/2020 |
| WO | 2020173895 | A1 | 9/2020 |
| WO | 2020260197 | A1 | 12/2020 |

* cited by examiner

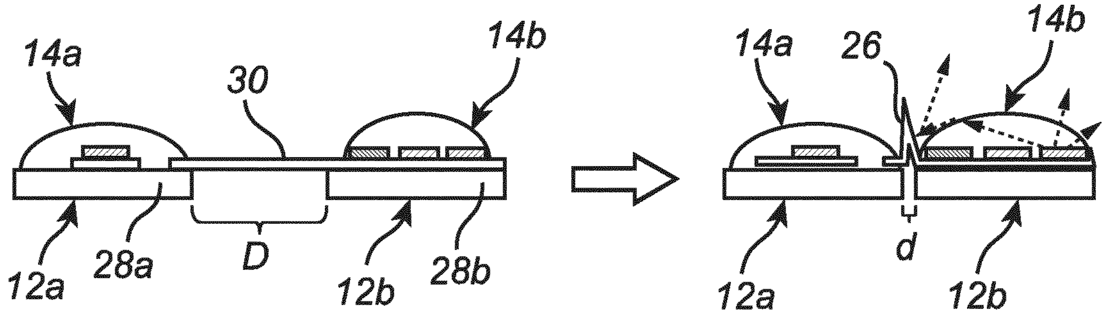
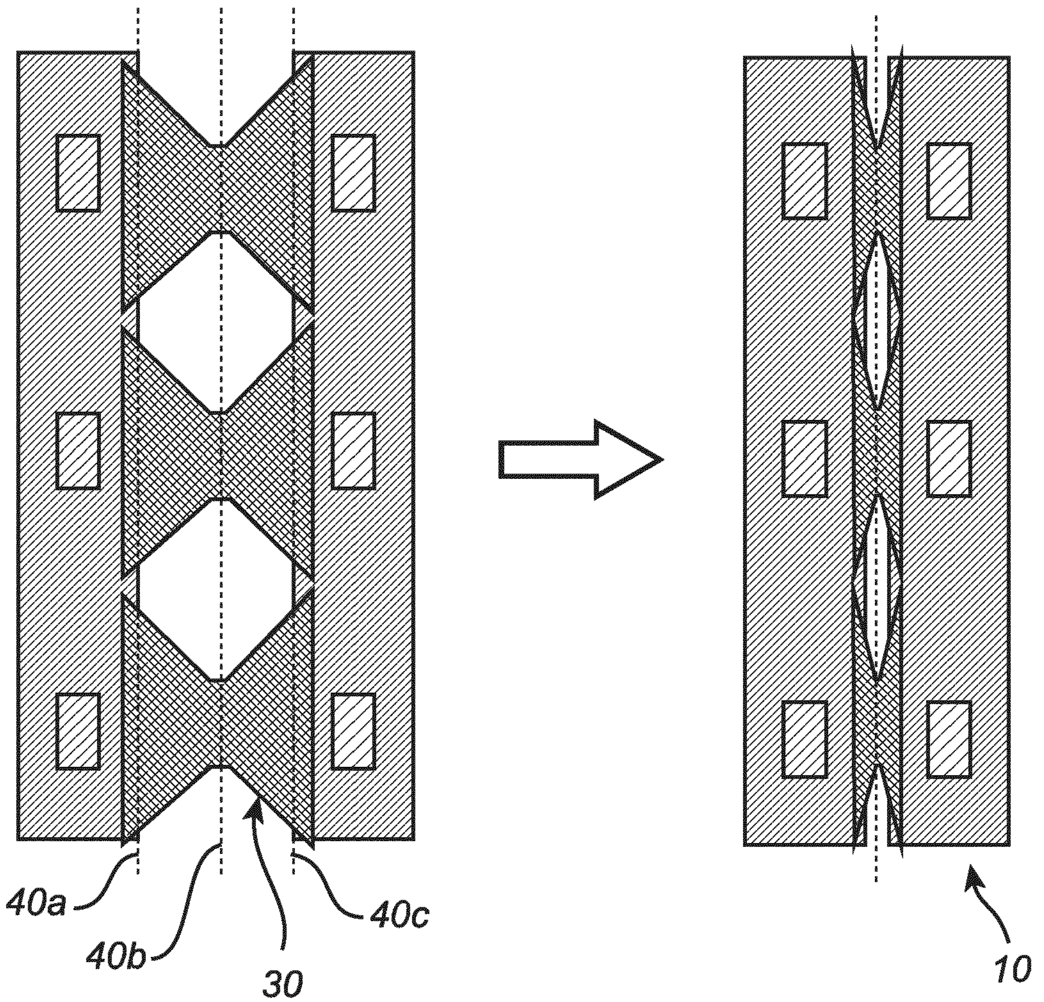
Fig. 5A
Fig. 5B

LIGHT EMITTING DIODE FILAMENT

CROSS-REFERENCE TO PRIOR APPLICATIONS

This application is the U.S. National Phase application under 35 U.S.C. § 371 of International Application No. PCT/EP2022/061399, filed on Apr. 28, 2022, which claims the benefit of European Patent application Ser. No. 21/172,834.0, filed on May 7, 2021. These applications are hereby incorporated by reference herein.

FIELD OF THE INVENTION

The present invention relates to an LED (light emitting diode) filament. The present invention also relates to an LED filament lamp comprising at least one such LED filament. The present invention also relates to a method of manufacturing an LED filament.

BACKGROUND OF THE INVENTION

Incandescent lamps are rapidly being replaced by LED (light emitting diode) based lighting solutions. It is nevertheless appreciated and desired by users to have retrofit lamps which have the look of an incandescent bulb. For this purpose, one can simply make use of the infrastructure for producing incandescent lamps based on glass and replace the filament with LEDs emitting white light. One of the concepts is based on LED filaments placed in such a bulb. The appearances of these lamps are highly appreciated as they look highly decorative.

A regular tuneable white filament lamp consists of at least two LED filaments, one with low CCT (correlated color temperature) LEDs and one with high CCT LEDs, or a filament with a combination of low and high CCT LEDs. When multiple colors are added to make a full color LED filament lamp, the color LEDs can be added into the lamp as a separate filament or can be placed on same surface of filament substrate together with the white LEDs.

In CN 112097129 a color-controllable LED luminescent lamp is disclosed. LED light sources are composed of mini-LED chips with the relatively small sizes, so that the number of the LED light sources capable of being contained in a lampshade is increased, the whole LED luminescent lamp can show more color types, and free showing and switching of multiple colors can be achieved.

SUMMARY OF THE INVENTION

If RGB and white LEDs strings are formed on same PCB or FPC (flexible printed circuit) surface of the filament, there can be unwanted cross-talk of light between RGB and white strings or between cool-white and warm-white LED strings. Such light-cross-talk will significantly reduce the color-gamut area produced by the filament in a clear bulb, e.g. when light emitted by direct blue LEDs is absorbed by red-yellow phosphor layer on top of white line and causes unwanted phosphorescence and unwanted red-yellow light generation. This unwanted red-yellow light emission will cause shift of filament color point from a pure blue region deeper inside the color space towards less saturated color points. Such un-saturated color appearance may not be preferred for color tuneable lamps.

It is an object of the present invention to overcome or at least alleviate this problem, and to provide an improved LED filament.

According to a first aspect of the invention, this and other objects are achieved by an LED filament, comprising: a first LED filament portion comprising a plurality of first LEDs adapted to emit first LED filament light; a second LED filament portion parallel to the first LED filament portion and comprising a plurality of second LEDs adapted to emit second LED filament light; and at least one light-blocking wall arranged between the first LED filament portion and the second LED filament portion to reduce or prevent optical cross-talk between the first LEDs of the first LED filament portion and the second LEDs of the second LED filament portion.

The present invention is based on the understanding that by arranging a light-blocking wall between the first and second LED filament portions of the filament, e.g. between a first string of white LEDs and a second string of RGB LEDs, unwanted intra-filament optical cross-talk may indeed be reduced or prevented. Accordingly, the present LED filament can have a not reduced color-gamut area and/or can achieve saturated color points.

Generally, an LED filament is providing LED filament light and comprises a plurality of light emitting diodes (LEDs) arranged in a linear array. Preferably, the LED filament has a length L and a width W, wherein L>5 W. The LED filament may be arranged in a straight configuration or in a non-straight configuration such as for example a curved configuration, a 2D/3D spiral or a helix. Preferably, the LEDs are arranged on an elongated carrier like for instance a substrate, that may be rigid (made from e.g. a polymer, glass, quartz, metal or sapphire) or flexible (e.g. made of a polymer or metal e.g. a film or foil). In case the carrier comprises a first major surface and an opposite second major surface, the LEDs are arranged on at least one of these surfaces. The carrier may be reflective or light transmissive, such as translucent and preferably transparent. The LED filament may comprise an encapsulant at least partly covering at least part of the plurality of LEDs. The encapsulant may also at least partly cover at least one of the first major or second major surface. The encapsulant may be a polymer material which may be flexible such as for example a silicone. Further, the LEDs may be arranged for emitting LED light e.g. of different colors or spectrums. The encapsulant may comprise a luminescent material that is configured to at least partly convert LED light into converted light. The luminescent material may be a phosphor such as an inorganic phosphor and/or quantum dots or rods. The LED filament may comprise multiple sub-filaments.

According to one or more embodiments, the plurality of first LEDs may be arranged on a surface of the first LED filament portion, wherein the plurality of second LEDs are arranged on a corresponding surface of the second LED filament portion such that the first LEDs are aimed in substantially the same direction(s) as the second LEDs, and wherein the at least one light-blocking wall raises above said surface of the first LED filament portion and the corresponding surface of the second LED filament portion.

By raising above the first surfaces where the LEDs are arranged, the at least one wall may block light just where it is needed.

The at least one light-blocking wall may have a height that exceeds the height of the first and second LEDs including any encapsulation thereof. At least one light-blocking wall of this height may indeed prevent most or all optical cross-talk between the first and second LEDs.

The first LED filament portion may comprise a first elongated carrier, wherein the second LED filament portion comprises a second elongated carrier, and wherein the first elongated carrier is mechanically connected to the second elongated carrier by at least one non-transparent layer. The at least one light-blocking wall may be formed by the at least one non-transparent layer. Preferably, said at least one non-transparent layer is bent along a boundary between the first LEDs and the second LEDs to form said at least one light-blocking wall. The at least one non-transparent layer, for example a metallization layer, may already be present in a PCB or FPC used to form the present LED filament portions, whereby the manufacturing process of this LED filament is simplified, since the need for any additional material deposition step for creation of a separation light-blocking wall may be eliminated. This is also a very thin way of preventing cross-talk, without compromising targeted aesthetics. The light-blocking wall(s) could be made out of any type of thin non-transparent bendable material, for example the aforementioned metallization layer, a local region of a flexible PCB covered with solder resist or paint, a region of a non-transparent flexible PCB, etc.

Furthermore, the at least one non-transparent layer could be generally non-transparent for all light (red, green, blue, UV, white) or selectively non-transparent (e.g. blocking blue but transmitting red). Accordingly, the at least one light-blocking wall may generally block (all) light or just block some type of light (e.g. blue).

The at least one non-transparent layer may be bent such that the at least one light-blocking wall is at least one fin-type light-blocking wall. The at least one non-transparent layer may for example be bent to include a /\-shaped cross section to form said at least one light-blocking wall, wherein /\='up arrowhead'. The at least one non-transparent layer could alternatively be bent to include a rectangular fin, for example.

As indicated above, the at least one light-blocking wall may be adapted to block LED filament light of a first color but not block LED filament light of at least a second color different than the first color. The at least one light-blocking wall may be adapted to block blue LED filament light but not block (i.e. transmit) LED filament light of other colors.

The at least one light-blocking wall may be segmented into wall segments along the length of the LED filament, wherein the wall segments are situated at the locations of the first and second LEDs along the LED filament, and wherein gaps with reduced or no wall height are situated at locations along the LED filament where no first or second LEDs are present. Such segmental structure of the light-blocking wall will allow bending of the LED filament along the length of the filament for required level of flexibility. Yet, the wall segments (or 'fins') at the first and second LEDs will allow to decrease locally a stress to LED chips solder points by limiting locally a radius of bending curvature for a flexible LED filament. It would result in a higher yield for LED filament manufacturing and a longer lifetime of the LED filament in a bulb by minimizing the risk of solder-joint failures. Accordingly, the LED filament may be segmentally bent along the length of the LED filament by bending (only) at said gaps. The wall segments are also located at the position of first and second LEDs to block the light most efficiently.

Each wall segment may have an isosceles trapezoid side view profile with a wider base than top. In this way, the LED filament may be subject to not only convex bending, but also (some) concave bending without adjoining wall segments interfering with each other.

The first LEDs may be white LEDs for emitting white first LED filament light, wherein the second LEDs are RGB (red green blue) LEDs for emitting colored second LED filament light. The white LEDs may be blue and/or UV LED chips encapsulated by an encapsulant comprising a luminescent material adapted to at least partly convert blue and/or UV LED light into converted LED light. Accordingly, the at least one light-blocking wall may prevent light emitted by direct blue LEDs of the RGB LEDs from being absorbed by the encapsulant/luminescent material encapsulating the blue/UV LED chips of the white LEDs, which otherwise would have caused unwanted phosphorescence and unwanted red-yellow light generation.

The LED filament may further comprise: a third LED filament portion parallel to the second LED filament portion and comprising a plurality of third LEDs adapted to emit third LED filament light; and at least one further light-blocking wall arranged between the second LED filament portion and the third LED filament portion to prevent optical cross-talk between the second and third LEDs. The at least one further light-blocking wall could have the same features as the previously mentioned light-blocking wall.

The third LEDs may be white LEDs for emitting white third LED filament light of a different color temperature than the white first LED filament light. This gives the possibility to create different color temperatures as well as colored light using the same LED filament (without crosstalk). The color temperature CT1 of the white first LED filament light could be <2500K, e.g. 2200K. The color temperature CT2 of the white third LED filament light could be >2700K, e.g. 3500K. The difference between CT2 and CT1 could be greater than 500K (CT2−CT1>500K). In a preferred embodiment, the three LED filament portions are used provide: warm white WW+RGB for colors+cool white CW.

In other embodiments, the order could be warm white WW+cool white CW (no RGB for colors) or warm white WW+cool white CW+RGB for colors or cool white CW+warm white WW+RGB for colors. In these embodiments (and in the above-mentioned preferred embodiment), whites of 2 CCT types may be separated from each other, and any white CCT string may be separated from individual R, G, and B chips or RGB clusters.

The LED filament could further comprise a fourth parallel LED filament portion, or a fourth parallel LED filament portion and a fifth parallel LED filament portion.

According to a second aspect of the invention, there is provided an LED filament lamp, comprising: at least one LED filament according to the first aspect; a light transmissive (translucent, preferably transparent) envelope at least partly surrounding said at least one LED filament arrangement; and a connector for electrically and mechanically connecting the LED filament lamp to a socket. The LED filament lamp may for example be retrofit light bulb. The LED filament lamp could further comprise a controller for individually controlling the LED filament portions of the LED filament(s). The LED filament lamp could be color and/or color temperature tuneable.

According to a third aspect of the invention, there is provided a method of manufacturing an LED filament, wherein the method comprises: providing a first LED filament portion comprising a first elongated carrier and a plurality of first LEDs adapted to emit first LED filament light; providing a second LED filament portion parallel to the first LED filament portion and comprising a second elongated carrier and a plurality of second LEDs adapted to emit second LED filament light, wherein the first elongated carrier is mechanically connected to the second elongated carrier by at least one substantially flat layer with excessive distance between the first and second elongated carriers; and bending the at least one substantially flat layer to form at least one light-blocking wall between the first LED filament portion and the second LED filament portion, whereby said excessive distance is reduced to a selected distance between the first and second elongated carriers. This aspect may exhibit the same or similar features and technical effects as any of the previous aspects, and vice versa. For example, to achieve the aforementioned fin-like wall segments with isosceles trapezoid profiles, the at least one substantially flat layer may be segmented into bow tie shaped segments.

It is noted that the invention relates to all possible combinations of features recited in the claims.

BRIEF DESCRIPTION OF THE DRAWINGS

This and other aspects of the present invention will now be described in more detail, with reference to the appended drawings showing embodiment(s) of the invention.

FIGS. 5*a-b* illustrates an embodiment of the manufacturing method of FIG. 4.

As illustrated in the figures, the sizes of layers and regions may be exaggerated for illustrative purposes and, thus, are provided to illustrate the general structures of embodiments of the present invention. Like reference numerals refer to like elements throughout.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

Figure 1:
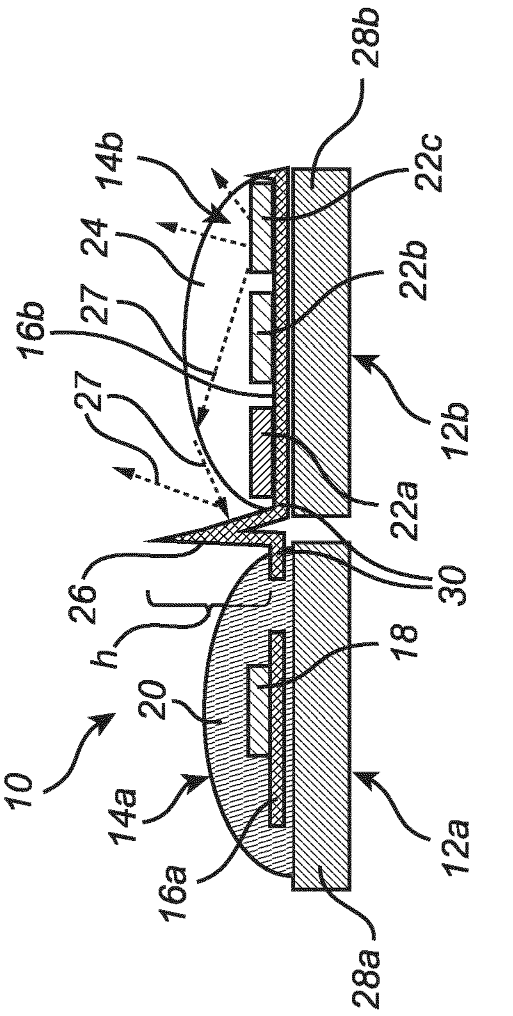
FIG. 1 is a cross-sectional view along the width of an LED filament according to an embodiment of the present invention.
Figure 3:
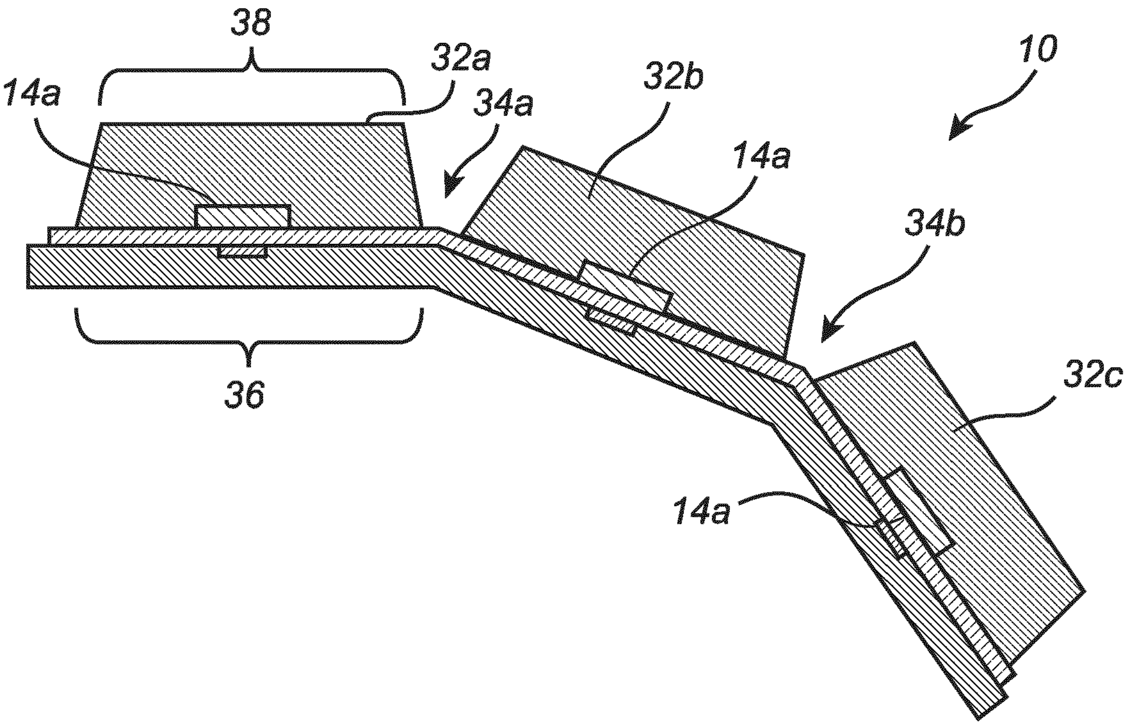
FIG. 3 is a side view of the LED filament of FIG. 2 segmentally bent along the length of the LED filament.

FIG. 1 shows an LED filament 10 according to an embodiment of the present invention. The LED filament 10 is generally adapted to provide LED filament light. The LED filament 10 can for example have a straight configuration (FIG. 7) or a bend configuration (FIG. 3).

The LED filament 10 comprises a first LED filament portion 12*a*. The first LED filament portion 12*a* comprises a plurality of first LEDs 14*a* adapted to emit first LED filament light. The first LEDs 14*a* may be arranged in a linear array along the length of the LED filament 10/first LED filament portion 12*a*. The first LEDs 14*a* may be arranged on a (first major) surface 16*a* of the first LED filament portion 12*a*. The first LEDs 14*a* may be white LEDs for emitting white first LED filament light. The white LEDs may be blue and/or UV LED chips 18 encapsulated by a first encapsulant 20 comprising a luminescent material adapted to at least partly convert blue and/or UV LED light into converted LED light.

The LED filament 10 further comprises a second LED filament portion 12*b*. The second LED filament portion 12*b* is substantially parallel to the first LED filament portion 12*a*. The first and second LED filament portions 12*a-b* could also be referred to as a first and second sub-filaments 12*a-b*. The second LED filament portion 12*b* comprises a plurality of second LEDs 14*b* adapted to second LED filament light. The first LED filament light and the second LED filament light may form the aforementioned LED filament light. The second LEDs 14*b* may be arranged in a linear array along the length of the LED filament 10 of the second LED filament portion 12*b*. The second LEDs 14*b* may be arranged on a corresponding (first major) surface 16*b* of the second LED filament portion 12*b*, such that the second LEDs 14*b* are aimed in substantially the same direction(s) as the first LEDs 14*a*. The second LEDs 14*b* may be RGB (red green blue) LEDs 22*a-c* for emitting colored second LED filament light. The RGB LEDs 22*a-c* may be encapsulated by a second encapsulant 24. The second encapsulant 24 may comprise a light scattering material.

The LED filament 10 further comprises at least one light-blocking wall 26. The at least one light-blocking wall 26 is arranged between the first and second LED filament portions 12*a-b*. The at least one light-blocking wall 26 serves to prevent or at least reduce optical cross-talk between the first and second LEDs 14*a-b*. Specifically, the at least one light-blocking wall 26 prevents light 27 emitted by direct blue LEDs 22*c* of the RGB LEDs from being absorbed by the first encapsulant 20, luminescent material encapsulating the blue/UV LED chips 18, which otherwise would have caused unwanted phosphorescence and unwanted red-yellow light generation. Accordingly, the present LED filament 10 can have a not reduced color-gamut area and/or can achieve saturated color points.

As seen in FIG. 1, the at least one light-blocking wall 26 raises above the surfaces 16*a-b* on which the first and second LEDs 14*a-b* are arranged. Preferably, the at least one light-blocking wall 26 has a height h that exceeds the height of the first and second LEDs 14*a-b* including the encapsulations 20, 24. The height h of the at least one light-blocking wall 26 may for example be in the range of 0.1-3 mm or preferably in the range of 0.1-2 mm. Furthermore, the at least one light-blocking wall 26 may extend along (substantially) the complete length of the LED filament 10 or along only a portion or portions of the length of the LED filament 10.

In a particular embodiment shown in FIG. 1, the elongated carrier 28*a* of the first LED filament portion 12*a* is mechanically connected to the elongated carrier 28*b* of the second LED filament portion 12*b* by at least one non-transparent layer 30. The at least one light-blocking wall 26 may be formed by (some of) the at least one non-transparent layer 30. Specifically, the at least one non-transparent layer 30 may be bent along a boundary 31 between the first and second LEDs 14*a-b* to form the at least one light-blocking wall 26. The at least one non-transparent layer 30 may for example be bent such that the at least one light-blocking wall 26 is at least one fin-type light-blocking wall with a A-shaped cross section, as seen in FIG. 1. The at least one non-transparent layer 30 may for example be metallization/metallized layers between different lines of the LED filament 10. Alternatively, the at least one non-transparent layer 30 may be a blue filter blocking just the blue light 27. That is, the at least one light-blocking wall 26 may be adapted to block LED filament light of a first color (blue) but not block (but instead transmit) LED filament light of at least a second color different than the first color.

Figure 2:
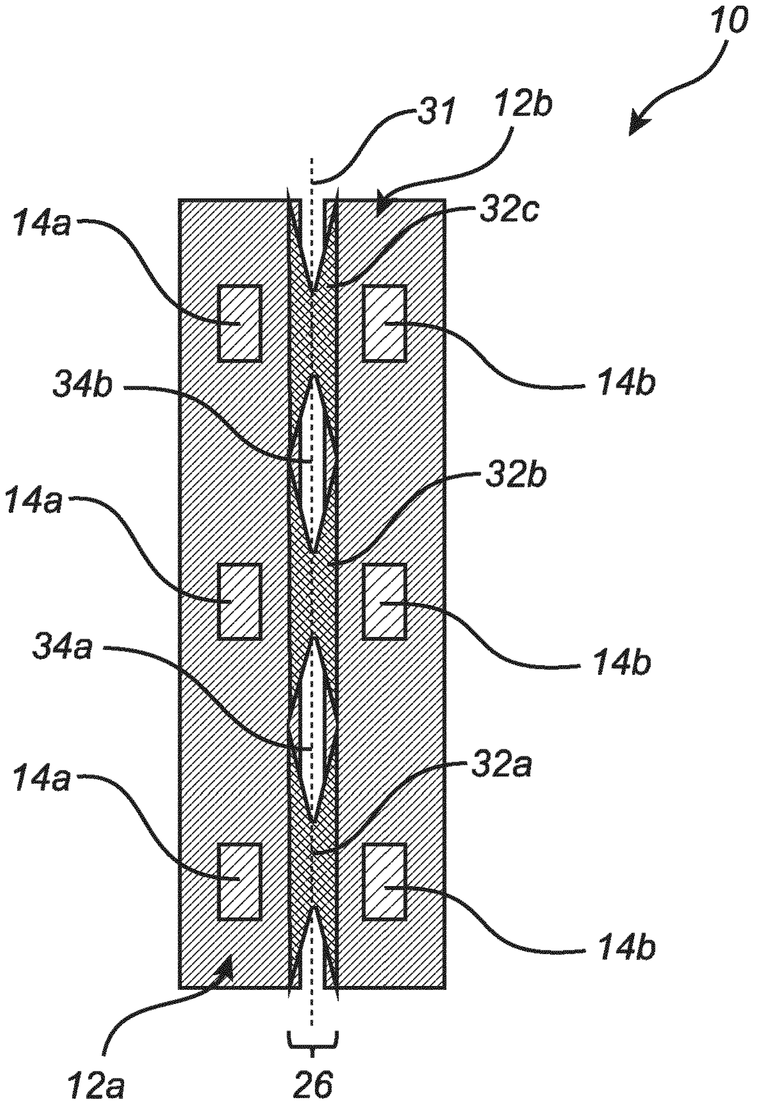
FIG. 2 is a top view of e.g. the LED filament of FIG. 1.

Turning to FIGS. 2-3, the at least one light-blocking wall 26 may be segmented into wall segments 32*a*-*c* along the length of the LED filament 10. There can be one wall segment per first/second LED. The wall segments 32*a*-*c* are preferably situated at the locations of the first and second LEDs 14*a*-*b* along the LED filament 10, whereas gaps 34*a*-*b* with reduced or no wall height are situated at locations along the LED filament 10 where no first or second LEDs 14*a*-*b* are present. Such a segmental structure allows the LED filament 10 to be segmentally bent (FIG. 3). Each wall segments 32*a*-*c* may have an isosceles trapezoid side view profile, with a wider base 36 than top 38. In this way, the LED filament 10 may be subject to not only convex bending (FIG. 3), but also concave bending (not shown). The elongated carriers 28*a*-*b* may here be flexible to allow the bending of the LED filament 10 as in FIG. 3. The LED filament 10 could also be (segmentally) twisted, to a spiral configuration, i.e. like a coil. In that case, the elongated carriers 28*a*-*b* could have appropriate notches (not shown) to allow the twisting.

Figure 4:
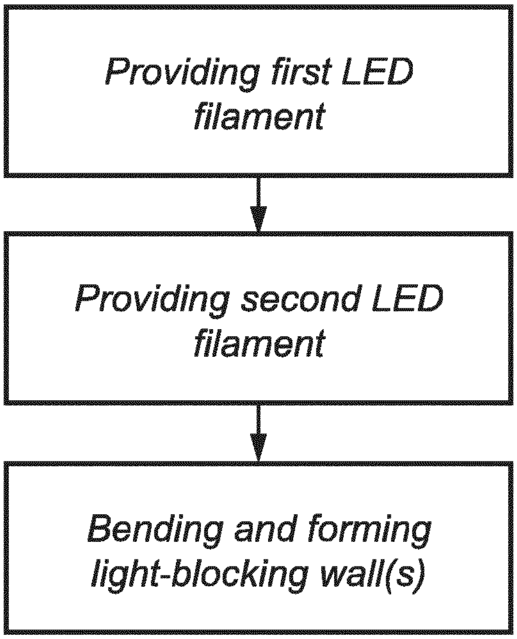
FIG. 4 is a flow chart of a method of manufacturing an LED filament.

With further reference to FIG. 4 and FIGS. 5*a*-*b*, the LED filament 10 may be manufactured as follows.

At S1, the first LED filament portion 12*a* comprising the first elongated carrier 28*a* and the plurality of first LEDs 14*a* is provided.

At S2, the second LED filament portion 12*b* comprising the second elongated carrier 28*b* and the plurality of second LEDs 14*b* is provided. The first elongated carrier 28*a* is mechanically connected to the second elongated carrier 28*b* by at least one substantially flat layer 30 with an excessive distance D between the first and second elongated carriers 28*a*-*b*, see FIG. 5*a*. The at least one substantially flat layer 30 may be the aforementioned non-transparent layer(s) 30. To achieve the aforementioned wall segments 32*a*-*c* (and gaps 34*a*-*b*), the at least one substantially flat layer 30 may be segmented into bow tie shaped segments as shown in FIG. 5*a*. It is appreciated that S1 and S2 could be performed at substantially the same time and/or combined.

At S3, the at least one substantially flat layer 30 is bent to form the at least one light-blocking wall 26 between the first and second LED filament portions 12*a*-*b*. Specifically, the at least one substantially flat layer 30 may be bent at three fold lines 40*a*-*c*, to form the at least one light-blocking wall 26 with A-shaped cross section. As the at least one substantially flat layer 30 is so bent, the excessive distance is consequently reduced to a selected (short) distance d between the first and second elongated carriers 28*a*-*b*, see FIG. 5*b*.

Figure 6:
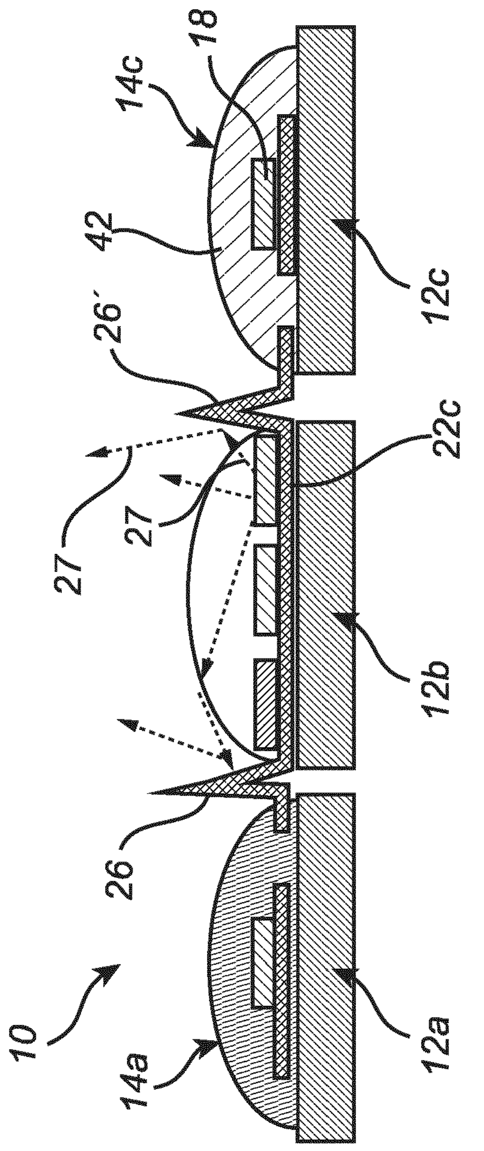
FIG. 6 is a cross-sectional view along the width of an LED filament according to another embodiment of the present invention.

FIG. 6 shows an LED filament 10 according to another embodiment of the present invention. The LED filament 10 in FIG. 6 may be similar to the previously discussed and shown LED filament, but further comprises a third LED filament portion (or sub-filament) 12*c*. The third LED filament portion 12*c* is substantially parallel to the second LED filament portion 12*b*. The third LED filament portion 12*c* may be arranged on the opposite side of the second LED filament portion 12*b* compared to the first LED filament portion 12*a*. In other words, the second LED filament portion 12*b* may be arranged between the first and third LED filament portions 12*a* and 12*c*.

The third LED filament portion 12*c* comprises a plurality of third LEDs 14*c* adapted to emit third LED filament light. The third LEDs 14*c* may be arranged in a linear array along the length of the LED filament 10/third LED filament portion 12*c*. The third LEDs 14*c* may be white LEDs for emitting white third LED filament light. These white LEDs 14*c* may be blue and/or UV LED chips 18 encapsulated by a third encapsulant 42 comprising a luminescent material adapted to at least partly convert blue and/or UV LED light into converted LED light. The white third LED filament light can have a different color temperature than the white first LED filament light. The color temperature CT1 of the white first LED filament light could be <2500K, whereas the color temperature CT2 of the white third LED filament light could be >2700K.

The LED filament 10 in FIG. 6 also comprises at least one further light-blocking wall 26' arranged between the second LED filament portion 12*b* and the third LED filament portion 12*c*. The at least one further light-blocking wall 26' serves to prevent or at least reduce optical cross-talk between the second and third LEDs 14*b*-*c*. Specifically, the at least one further light-blocking wall 26' prevents light 27 emitted by direct blue LEDs 22*c* of the RGB LEDs from being absorbed by the third encapsulant 42/luminescent material encapsulating the blue/UV LED chips 18 of the third LEDs 14*c*. The at least one further light-blocking wall 26' could have the one or more of the same features as the previously mentioned light-blocking wall 26.

Figure 7:
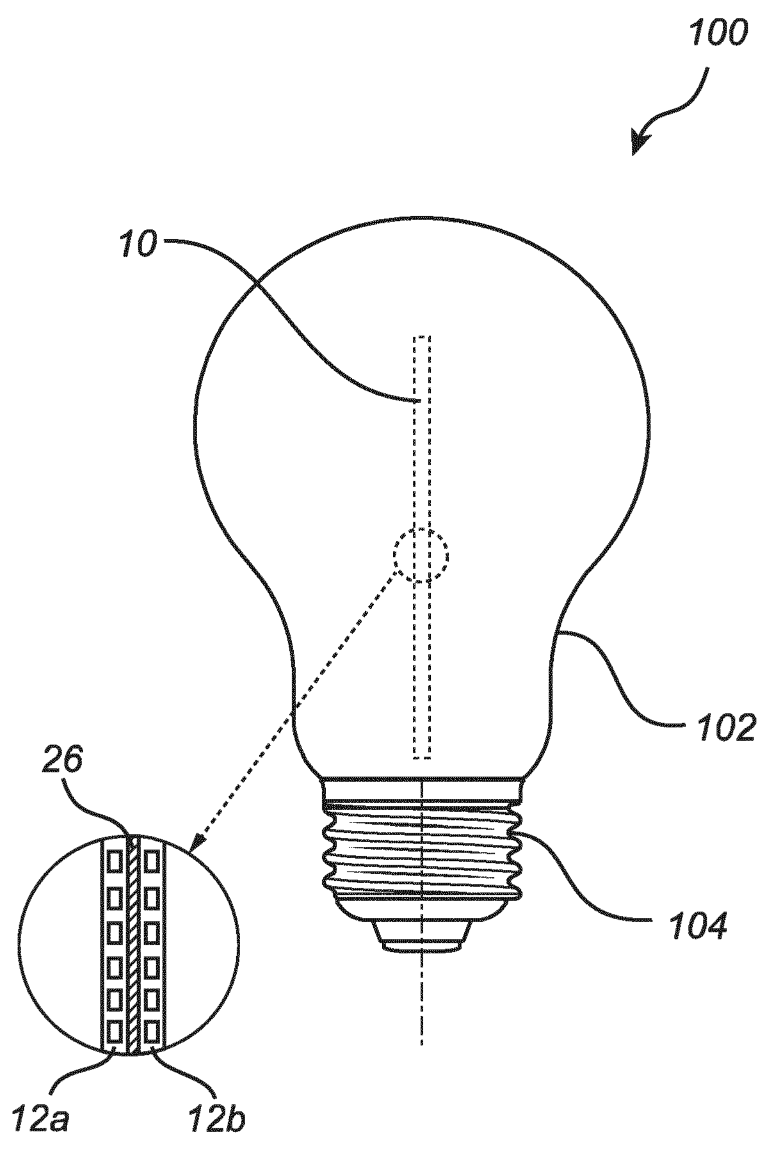
FIG. 7 is a side view of a retrofit light bulb with an LED filament according to one or more embodiments of the present invention.

FIG. 7 shows an LED filament lamp 100, namely a retrofit light bulb. The lamp 100 comprises at least one LED filament 10 according to one or more embodiments of the present invention. The LED filament 10 in FIG. 7 has a straight (non-bent) configuration. The LED filament 10 in FIG. 7 has a (substantially) vertical orientation.

The lamp 100 further comprises a transparent envelop 102 surrounding the LED filament 10. The envelop 102 can be clear. The envelop 102 is preferably made of glass. The envelop 102 may have various shapes. The lamp 100 further comprises a threaded connector/cap 104 for electrically and mechanically connecting for the lamp 100 to an external socket (not shown). The connector/cap 106 can be of various types known per se, for example E14 or E27. The lamp 100 may further comprise a controller (not shown) for individually controlling the LED filament portions/sub-filaments of the LED filament 10.

The person skilled in the art realizes that the present invention by no means is limited to the preferred embodiments described above. On the contrary, many modifications and variations are possible within the scope of the appended claims.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent 10 claims does not indicate that a combination of these measured cannot be used to advantage.

The invention claimed is:

1. An LED filament, comprising:

a first LED filament portion comprising a plurality of first LEDs adapted to emit first LED filament light;

a second LED filament portion parallel to the first LED filament portion and comprising a plurality of second LEDs adapted to emit second LED filament light; and at least one light-blocking wall arranged between the first LED filament portion and the second LED filament portion to reduce or prevent optical cross-talk between the first LEDs of the first LED filament portion and the second LEDs of the second LED filament portion, said at least one light-blocking wall being adapted to block LED filament light of a first color but not block LED filament light of at least a second color different than the first color, wherein the first LED filament portion comprises a first elongated carrier, wherein the second LED filament portion comprises a second elongated carrier, wherein the first elongated carrier is mechanically connected to the second elongated carrier by at least one non-transparent layer, and wherein said at least one light-blocking wall is formed by said at least one non-transparent layer.

2. An LED filament according to claim 1, wherein the plurality of first LEDs are arranged on a surface of the first LED filament portion, wherein the plurality of second LEDs are arranged on a corresponding surface of the second LED filament portion such that the first LEDs are aimed in substantially the same direction(s) as the second LEDs, and wherein the at least one light-blocking wall raises above said surface of the first LED filament portion and the corresponding surface of the second LED filament portion.

3. An LED filament according to claim 1, wherein the at least one light-blocking wall has a height (h) that exceeds the height of the first and second LEDs including any encapsulation thereof.

4. An LED filament according to claim 1, wherein said at least one non-transparent layer is bent along a boundary between the first LEDs and the second LEDs to form said at least one light-blocking wall.

5. An LED filament according to claim 1, wherein said at least one non-transparent layer is bent such that the at least one light-blocking wall is at least one fin-type light-blocking wall.

6. An LED filament according to claim 1, wherein the at least one light-blocking wall is segmented into wall segments along the length of the LED filament, wherein the wall segments are situated at the locations of the first and second LEDs along the LED filament, and wherein gaps with reduced or no wall height are situated at locations along the LED filament where no first or second LEDs are present.

7. An LED filament according to claim 6, segmentally bent along the length of the LED filament by bending at said gaps.

8. An LED filament according to claim 6, wherein each wall segment has an isosceles trapezoid side view profile with a wider base than top.

9. An LED filament according to claim 1, wherein the first LEDs are white LEDs for emitting white first LED filament light, and wherein the second LEDs are RGB LEDs for emitting colored second LED filament light.

10. An LED filament according to claim 1, further comprising:

a third LED filament portion parallel to the second LED filament portion and comprising a plurality of third LEDs adapted to emit third LED filament light; and at least one further light-blocking wall arranged between the second LED filament portion and the third LED filament portion to reduce or prevent optical cross-talk between the second and third LEDs.

11. An LED filament according to claim 10, wherein the third LEDs are white LEDs for emitting white third LED filament light of a different color temperature than the white first LED filament light.

12. An LED filament lamp, comprising:

at least one LED filament according to claim 1;

a light transmissive envelope at least partly surrounding said at least one LED filament arrangement; and a connector for electrically and mechanically connecting the LED filament lamp to a socket.

13. A method of manufacturing an LED filament, wherein the method comprises:

providing a first LED filament portion comprising a first elongated carrier and a plurality of first LEDs adapted to emit first LED filament light;

providing a second LED filament portion parallel to the first LED filament portion and comprising a second elongated carrier and a plurality of second LEDs adapted to emit second LED filament light, wherein the first elongated carrier is mechanically connected to the second elongated carrier by at least one substantially flat layer with excessive distance between the first and second elongated carriers; and bending the at least one substantially flat layer to form at least one light-blocking wall between the first LED filament portion and the second LED filament portion, said at least one light-blocking wall being adapted to block LED filament light of a first color but not block LED filament light of at least a second color different than the first color, whereby said excessive distance is reduced to a selected distance between the first and second elongated carriers.

* * * * *